US008462107B2

(12) United States Patent  (10) Patent No.: US 8,462,107 B2
Fairweather et al.  (45) Date of Patent: Jun. 11, 2013

(54) POINTING DEVICE AND METHOD WITH ERROR PREVENTION FEATURES

(75) Inventors: Peter G. Fairweather, Yorktown Heights, NY (US); Sharon Mary Trewin, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 12/245,293

(22) Filed: Oct. 3, 2008

(65) Prior Publication Data

US 2010/0085302 A1    Apr. 8, 2010

(51) Int. Cl.
*G06F 3/33*    (2006.01)

(52) U.S. Cl.
USPC ........... 345/157; 345/158; 345/161; 345/163; 345/165; 345/167

(58) Field of Classification Search
USPC ............. 345/1.1, 1.3, 30, 156–184, 426, 581, 345/589, 594, 619, 621, 629, 672; 178/18.01–18.06; 715/702, 808, 821, 760
See application file for complete search history.

(56) References Cited

U.S. PATENT DOCUMENTS

| | | | |
|---|---|---|---|
| 4,868,549 A * | 9/1989 | Affinito et al. | 345/164 |
| 5,022,170 A * | 6/1991 | House | 40/358 |
| 5,086,296 A | 2/1992 | Clark | |
| 5,231,381 A * | 7/1993 | Duwaer | 345/174 |
| 5,402,151 A * | 3/1995 | Duwaer | 345/173 |
| 6,070,838 A * | 6/2000 | Luginsland | 248/118.5 |
| 6,089,453 A * | 7/2000 | Kayser et al. | 235/383 |
| 6,166,723 A * | 12/2000 | Schena et al. | 345/184 |
| 6,262,717 B1 * | 7/2001 | Donohue et al. | 345/173 |
| 6,417,837 B1 | 7/2002 | Baba | |
| 6,473,069 B1 * | 10/2002 | Gerpheide | 345/157 |
| 6,563,487 B2 * | 5/2003 | Martin et al. | 345/156 |
| 6,665,173 B2 * | 12/2003 | Brandenberg et al. | 361/679.09 |
| 6,677,927 B1 | 1/2004 | Bruck et al. | |
| 6,967,642 B2 * | 11/2005 | SanGiovanni | 715/702 |
| 7,016,182 B2 * | 3/2006 | Brandenberg et al. | 361/679.06 |
| 7,081,883 B2 | 7/2006 | Chen | |
| 7,654,826 B2 * | 2/2010 | Faulkner et al. | 434/130 |
| 8,049,193 B1 * | 11/2011 | Appleby et al. | 250/505.1 |
| 8,199,114 B1 * | 6/2012 | Jaeger et al. | 345/173 |
| 2001/0048589 A1 * | 12/2001 | Brandenberg et al. | 361/683 |
| 2002/0030664 A1 * | 3/2002 | Schena et al. | 345/163 |

(Continued)

FOREIGN PATENT DOCUMENTS

WO    WO 97/18546    *    5/1997

OTHER PUBLICATIONS

G. Casiez et al., RubberEdge: Reducing Clutching by Combining Position and Rate Control with Elastic Feedback; UIST' 07, Oct. 7-10, 2007; Newport, RI, USA; pp. 129-138.

(Continued)

*Primary Examiner* — Prabodh M Dharia
(74) *Attorney, Agent, or Firm* — Tutunjian & Bitetto, P.C.; William Stock

(57) ABSTRACT

A pointing device and method include a pad occupying a region, a raised border at a perimeter of the region and an object slidably movable on the pad for contacting the border. A detecting device is configured to detect a physical contact by the object at any position on the border wherein contact with the border generates a signal indicating a contact position on the border.

25 Claims, 8 Drawing Sheets

U.S. PATENT DOCUMENTS

| | | |
|---|---|---|
| 2003/0011565 A1 | 1/2003 | Chan |
| 2003/0016211 A1* | 1/2003 | Woolley ................. 345/173 |
| 2003/0030619 A1* | 2/2003 | Martin et al. ............. 345/156 |
| 2003/0132914 A1* | 7/2003 | Lee ..................... 345/163 |
| 2003/0214482 A1* | 11/2003 | Chen .................... 345/163 |
| 2004/0017355 A1* | 1/2004 | Shim .................... 345/157 |
| 2004/0207601 A1* | 10/2004 | SanGiovanni ............. 345/156 |
| 2005/0151727 A1 | 7/2005 | Kwong |
| 2005/0243072 A1* | 11/2005 | Denoue et al. ............ 345/179 |
| 2006/0075356 A1* | 4/2006 | Faulkner et al. .......... 715/782 |
| 2006/0238519 A1* | 10/2006 | Westerman et al. ......... 345/173 |
| 2008/0042989 A1 | 2/2008 | Westerman et al. |
| 2008/0062145 A1 | 3/2008 | Shahoian et al. |
| 2008/0078590 A1 | 4/2008 | Sequine |
| 2008/0238879 A1* | 10/2008 | Jaeger et al. ............ 345/173 |

OTHER PUBLICATIONS

J. Froehlich et al., Barrier Pointing: Using Physical Edges to Assist Target Acquisition on Mobile Device Touch Screens; ASSETS '07; Oct. 15-17, 2007; Tempe, AZ, USA; 8 pages.

Synaptics Incorporated; RoundPad Product Brief; website; http://www.synaptics.com/products/ropad.cfm; 2008; 3 pages.

* cited by examiner

POINTING DEVICE AND METHOD WITH ERROR PREVENTION FEATURES

BACKGROUND

1. Technical Field

The present invention relates to pointing devices and more particularly to devices and methods which permit a user to point and click in a computer environment without the need for sustained control movements.

2. Description of the Related Art

Typical pointing devices can be difficult to use when environmental conditions or physical impairments limit the user's accuracy, or the available space in which to move. A mouse requires sustained, accurate pointing actions and the ability to click an integrated button without losing a position of the mouse. A dedicated wheel on a mouse or other device provides scrolling capabilities, but this places considerable strain on an operating finger for the wheel.

The mouse also requires movement over a relatively large area, and must be lifted and repositioned when the edge of the available surface is reached. It is difficult to grasp and release a mouse without moving the cursor position especially if the user has impairment. Trackballs solve many of these problems, but require the user to lift their hand off the ball repeatedly in order to roll the ball further, or to make a click. Joysticks require a sustained, controlled movement, and touch pads also require lifting and repositioning of the finger.

SUMMARY

A pointing device and method include a pad occupying a region, a raised border at a perimeter of the region and an object slidably movable on the pad for contacting the border. A detecting device is configured to detect a physical contact by the object at any position on the border wherein contact with the border generates a signal indicating a contact position on the border.

A method for controlling a generated pointer includes providing a pad occupying a region, a raised border at a perimeter of the region and a detecting device configured to detect a physical contact at any position on the border wherein contact with the border generates a signal indicating a contact position on the border; interpreting contact at a location on a border as a command to move a generated pointer in a respective direction; and moving the generated pointer in the respective dimension while the contact persists.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
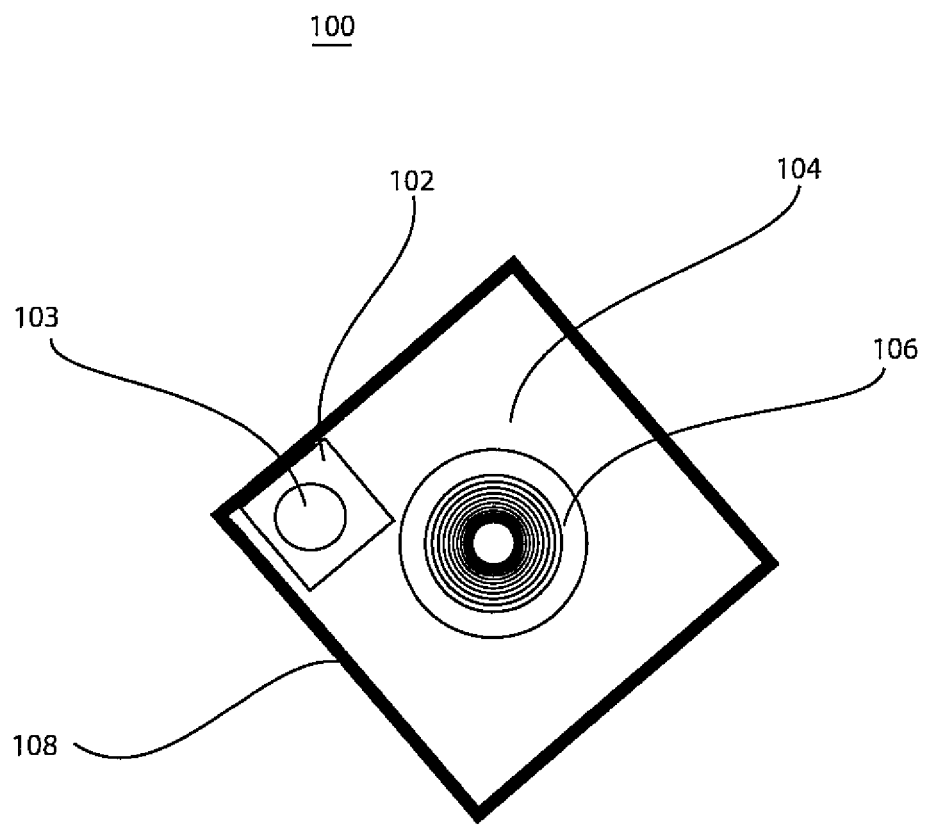
FIG. 1 is a top view of a pointing device in accordance with one illustrative embodiment.

The present principles provide a pointing device that does not require sustained control movements, can be operated in a small area without lifting the hand off the device, has integrated scrolling capability, and eliminates problems where users click inadvertently or where they accidentally move or lift a pointing device while trying to click. In one embodiment, the device includes a surface upon which a user slides a disk to create events related to moving and clicking that can be interpreted by a computer to which the device is attached. The surface may be square, circular, etc., and preferably has its shape congruent to that of the disk that the user moves.

The surface may have a depressed center or other mechanism that draws a free disk away from edges of the surface or pad. Around the perimeter of the surface is a raised, magnetized edge or other "sticky mechanism" to sustain contact with the edge of the pad once contact has been made. The disk can be pushed against the edge, and if released, the disk will be held in position at the edge. If the disk is not in contact with the edge, the disk, if free, moves toward the center of the pad.

The contact edges of the surface define directions of movement. When the disk is against an edge, an on-screen cursor moves in the direction indicated by the position on the edge relative to the center (or other reference point) of the surface. When the disk is not touching an edge, the cursor does not move.

The user may affect a "click" by pressing on the disk while it is at the center of the surface upon which it slides. The center of the surface may exert a slight magnetic attraction to the disk. Force feedback may be used to give tactile feedback for the click (e.g., a noise, vibration, etc.). The device may be operated by the user sliding the disk across the surface to generate movements in the appropriate direction when contact is made at the edges. The raised edge and magnetization serve to compensate for variations in the forces applied by the user. Alternatively, the user may release the disk when in contact with an edge and movement will continue.

Clicking can be performed without releasing the disk, and the action of clicking will not cause any unwanted cursor movements. Various transfer functions can be applied to the movement characteristics of the cursor, making it move at a constant speed, accelerate, move at a speed relative to the speed of the button movement taken to reach the edge, or move at a speed relative to the pressure applied to the edge. Moving the disk around the edge of the surface can be interpreted as a scrolling movement, or as movement through a tab chain of on-screen elements (equivalent to multiple presses of the 'tab' key when navigating with keystrokes).

Embodiments of the present invention can take the form of an entirely hardware embodiment or an embodiment including both hardware and software elements. In a preferred embodiment, the present invention is implemented in hardware with software elements. The software may include but is not limited to firmware, resident software, microcode, etc.

Furthermore, the invention can take the form of or include a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The devices in accordance with the present principles may include an integrated circuit chip, e.g., for sensing operations, such as pressure or position of the disk. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GDSII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now to the drawings in which like numerals represent the same or similar elements and initially to FIG. 1, a top view of a pointing device 100 is illustratively shown in accordance with the present principles. Device 100 includes a low friction surface or pad 104. Pad 104 may include any number of low friction materials including plastics (e.g., high density polyethylene, polytetrafluoroethylene, etc.), rubber materials (e.g., neoprene), fabric or combinations thereof. Pad 104 is preferably rigid or semi-rigid to be capable of transferring force applied at any point to a pressure sensor for determining when clicking operations are performed. Pad 104 may be formed to include a central depression region 106, which is preferably in the middle of pad 104. Pad 104 may be rectangular, circular, elongated, or any other shape. Pad 104 is bounded by a raised border 108 or lip.

A sliding disk 102 is formed from a low friction material and slidably engages pad 104. The disk 102 is confined by the border or lip 108. The disk 102 may include a finger depression 103 to receive a finger of a user of the device 100 during operation. Disk 102 and border 108 are preferably configured to create an attractive force between them. This may include magnetic forces, mechanical forces (adhesives, interlocking mechanical features) or the like. Disk 102 and border 108 may include magnetic materials or wires to create magnetic attractive forces between these components during operation of the device 100.

When disk 102 is not contacted with a border 108, the disk slides toward the center 106 due to the low frictional forces and/or the weight of the disk 102. In other embodiments, the center 106 may include other attractive forces to draw the disk 102 to the center 106, such as a magnetic field that can accelerate the disk 102 toward the center 106.

Figure 2:
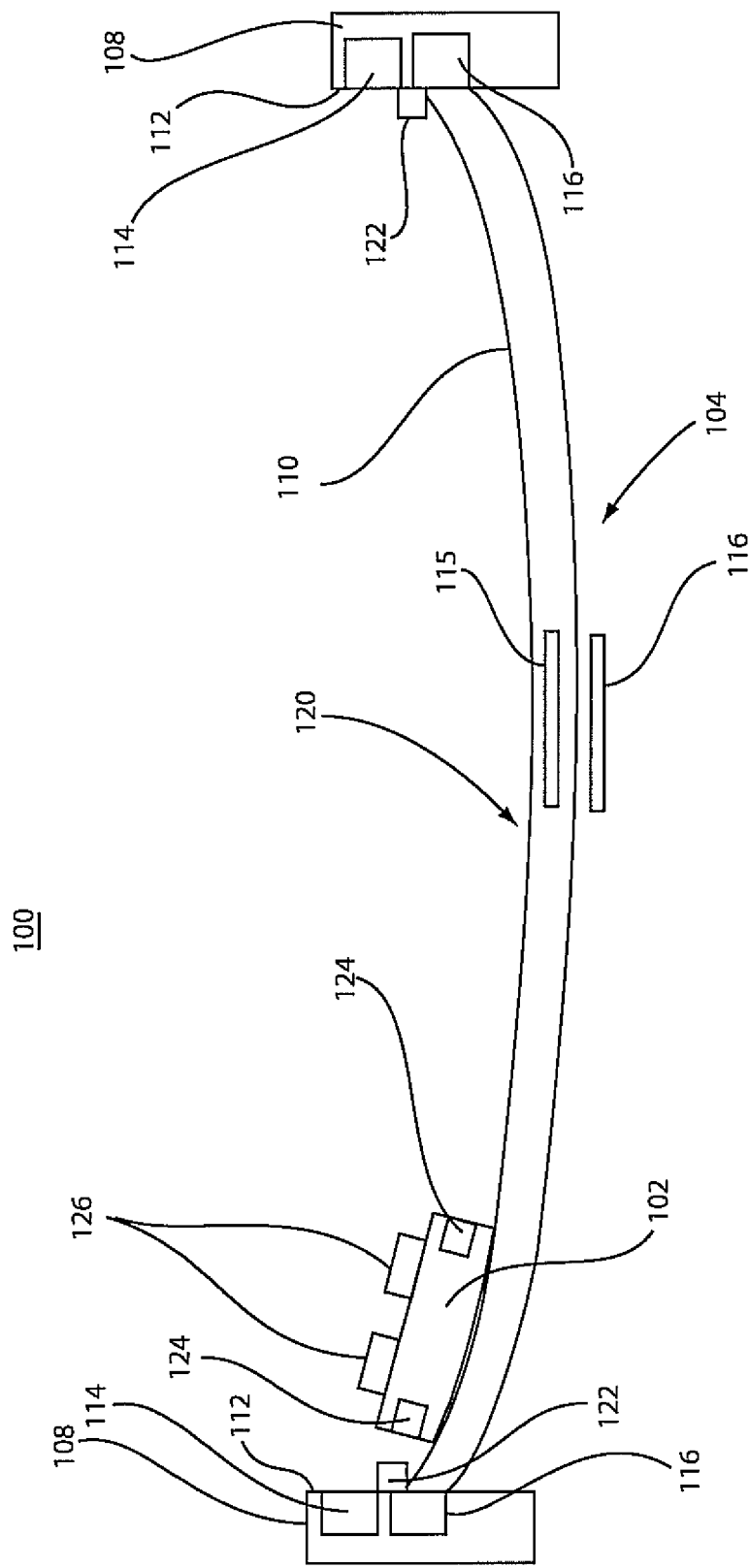
FIG. 2 is a side cross-sectional view of the pointing device of FIG. 1 showing greater detail in accordance with the present principles.

Referring to FIG. 2, a side cross-sectional view of the device 100 is illustratively depicted. The border 108 may form a lip around pad 104 and/or may include a support structure for pad 104. Disk 102 slides across surface 110 to permit movement thereon. The movement of disk 102 is easily achieved due to low friction. A sensor or sensors 116 detect a position of the disk 102 relative to borders 108. This may be achieved by one or more pressure sensors, stress/strain sensors, detectors which measure changes in magnetic fields, light sensors or any other detection technology detectors.

When the disk 102 is in contact with the border 108, cursor movement is generated using the pointing device 100. In one embodiment, a weak force is generated between the disk 102 and the border 108 to permit these components to "stick" together (magnetic forces, adhesive force, etc.). In this way, sustained cursor movement is achieved without the user having to sustain movement to continue positional change of a cursor on a display. Sensor(s) 116 are employed to determine a position along the border 108 where contact is made between the disk 102 and the border 108.

The pointing device 100 advantageously does not require sustained control movements, and can be operated in a small area without lifting the hand off the device 100. An integrated scrolling capability is provided by moving the disk 102 along the border 108 as opposed to merely engaging the border at a single location. Moving the disk 102 around the edge of the surface can be interpreted as a scrolling movement, or as movement through a tab chain of on-screen elements (equivalent to multiple presses of the 'tab' key when navigating with a keystrokes or arrow keys to move the cursor through line or fields). Scrolling is interpreted when two or more detectors determine movement about the perimeter of the pad 104 along its border 108.

The border 108 surrounds the perimeter of the surface 110 and includes a raised edge 112. The disk 102 can be pushed against the edge 112, and if released it will be held in position by magnets 114 and 124 or other connecting features 122. Connecting features 122 may include deformable borders 108, mechanical features, adhesive materials, etc. Contact with the edges 112 defines directions of movement. When the disk 102 is against an edge 112, an on-screen cursor (not shown) moves in the direction indicated by the position on the edge relative to a center 120 of the surface 110 (or other reference point). When the disk 102 is not touching an edge 112, the cursor does not move. The center 120 of the device 100 (which may also have attractive forces for attracting the disk 102) represents a click, which the user performs by pressing on the disk 102 to depress pad 104.

Force or tactile feedback may be provided for the click. The device 100 may be operated by the user sliding the disk 102 across the surface 110 to contact and edge 112 to generate movements in an appropriate direction. The raised edge or border 108 and magnetization or "sticking" to the edge serve to compensate for variations in the forces applied by the user. In one embodiment, the disk 102 and surface 110 have an attractive force helping to keep the disk 102 on the surface 110 or an attractive force to move the disk 102 toward the center 120 when the disk 102 is not engaged at an edge 112. The attractive forces may be generated using magnets 115 and 124. In another embodiment, the disk 102 and border 108 have an attractive force to help keep the disk 102 in contact with the border 108 during operations. The user may release the disk 102 and movement will continue if the disk is in contact with the edge 112 or border 108. In another embodiment, the edge 112 gives or yields in response to pressure, helping to hold the disk 102 in position. The edge 108 may include a deformable material or a sticky material to promote attractive forces. In yet another embodiment, a mechanism 122 (magnet or shape or texture of the surfaces (e.g., interlocking features, etc.)) encourages the disk 102 to lock at the edge 112 so a user can release the disk 102 while still sustaining movement.

Clicking can be performed without releasing the disk 102, and the action of clicking will not cause any unwanted cursor movements. Of course, the signals received from the different positions and conditions of the disk 102 relative to edges 112 and pad 104 can be interpreted in many ways. For example, different transfer functions can be applied to the movement characteristics of the cursor, making it move at a constant speed, accelerate, move at a speed relative to the speed of movement taken to reach an edge 112, or to move at a speed relative to the pressure applied to the edge 112.

Sensors 116 may be implemented in one or more different technologies. Sensors 116 may include pressure sensors, magnetic sensors, stress/strain sensors or any other sensor that can be configured to appropriately interpret the actions of a user in accordance with the present principles.

Device 100 generates two-dimensional positioning data as a user moves the disk 102 over the surface 110. The surface 110 has a raised edge 112 or border 108 such that contact with the edge produces movement of a cursor or pointing device. The position on the edge 112 corresponds to a direction of movement. In one embodiment, pressure applied on the edge 112 can be translated to a velocity of movement of a cursor on a display.

In one embodiment, the surface 110 of pad 104 is concave so that the disk 102 naturally slips back down to the center 120 when released. In another embodiment, no disk is needed and a user's touch is employed to apply pressure to the edge 112 which is employed to translate to movement of a cursor. Pressure on the center 120 of the surface 110 may be employed to produce a click event or pressure on the disk 102 to produce the click event. In another embodiment, separate buttons for clicking may be provided.

Another feature may include a three dimensional version of the pointing device 100 where pressure on the surface 110 corresponds to a third dimension of movement where the surface gives in response to pressure.

Figure 3:
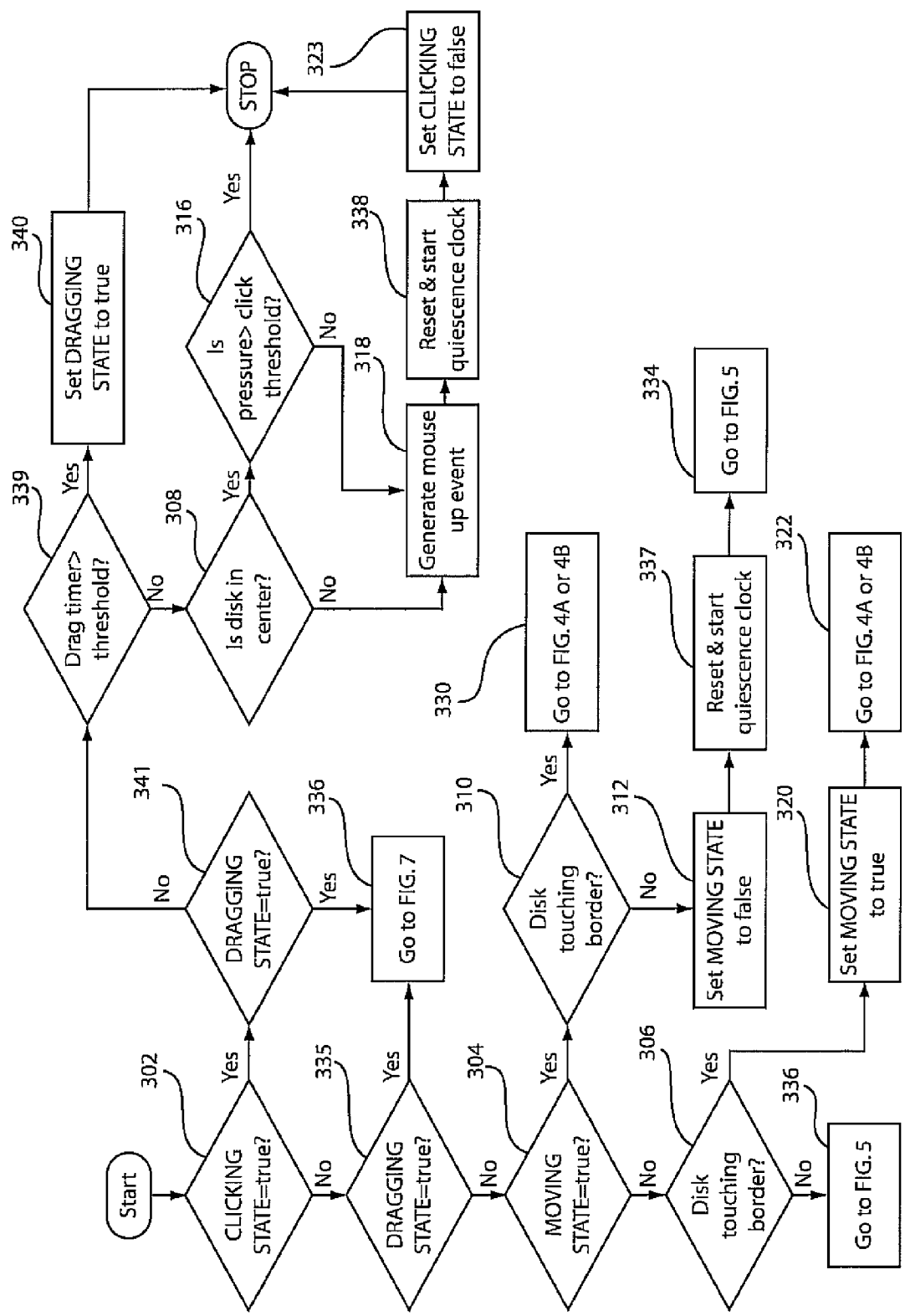
FIG. 3 is a block/flow diagram showing an operating method for a pointing device in accordance with one illustrative embodiment.

Referring to FIG. 3, a block/flow diagram for a method for interpreting pointing device actions is illustratively depicted. FIG. 3 is preferably implemented in software, which may be loaded on a computer device where a pointing application is needed. Pointing applications may include moving a cursor on a display, or any other pointing application.

The program begins with checking a status of "clicking", "dragging," or "moving" states in blocks 302, 335, and 304 where true denotes that clicking, dragging, or moving are respectively initiated. In block 302, a determination is made as to whether clicking is true. If clicking is not true, a determination of dragging is made in block 335. If dragging is not true, a determination of moving is made in block 304. If moving is not true, then a determination of whether a disk is touching a border is made in block 306.

If clicking is true in block 302, a determination is made as to whether dragging is true in block 341. If it is not, then a determination is made in block 339 as to whether a drag timer, an elapsed time clock that measures the amount of time between a "down" event and the subsequent "up" event, has exceeded a given threshold. If it has exceeded the threshold, the dragging state is set to true in block 340. If the drag timer tested in block 339 has not exceeded the timing threshold, a determination is made in block 308 as to whether the disk is in the center of the pad (e.g., not touching a border). If the disk is in the center, a determination is made, in block 316, as to whether a pressure applied by the user is sufficient to exceed a click threshold. If there is sufficient pressure, the program is stopped and the clicking state remains true (e.g., the user clicked the device). If the disk is not in the center (e.g., touching a border) as determined in block 308 or if there is insufficient pressure registered to exceed the pressure threshold as determined in block 316, then in block 318, a mouse up event is triggered.

Block 318 is followed by block 338 where a "quiescence clock" is reset and started. This clock records the time that has elapsed since the disk last moved and since the clicking state changed. In other words, the quiescence clock in block 338 measures the amount of time since the last time any movement or clicking events occurred. After this, the clicking state is set to false in block 323.

If the moving state 304 is true, a determination is made as to whether the disk is touching a border in block 310. If the disk is not touching a border, moving is set to false in block 312. If in block 310, the disk is touching a border, then go to FIG. 4A or 4B in block 330. Then, the quiescence clock is reset and started in block 337, and the program goes to FIG. 5 as per block 334.

Figure 4A:
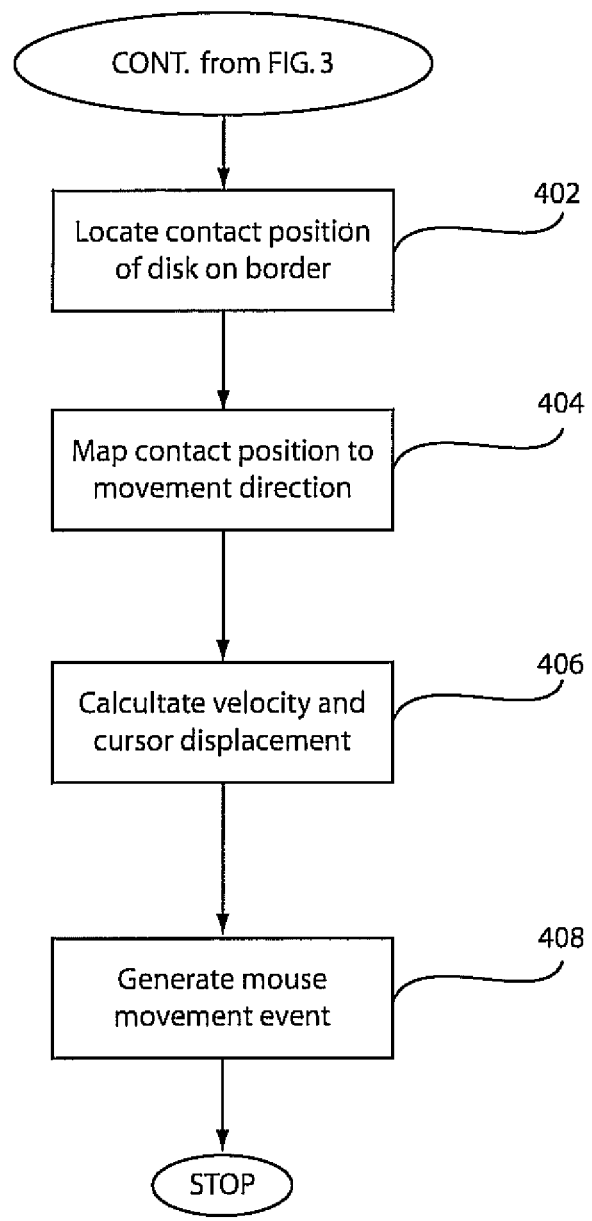
FIG. 4A is a block diagram showing how sustained movement is achieved in accordance with one illustrative embodiment.
Figure 4B:
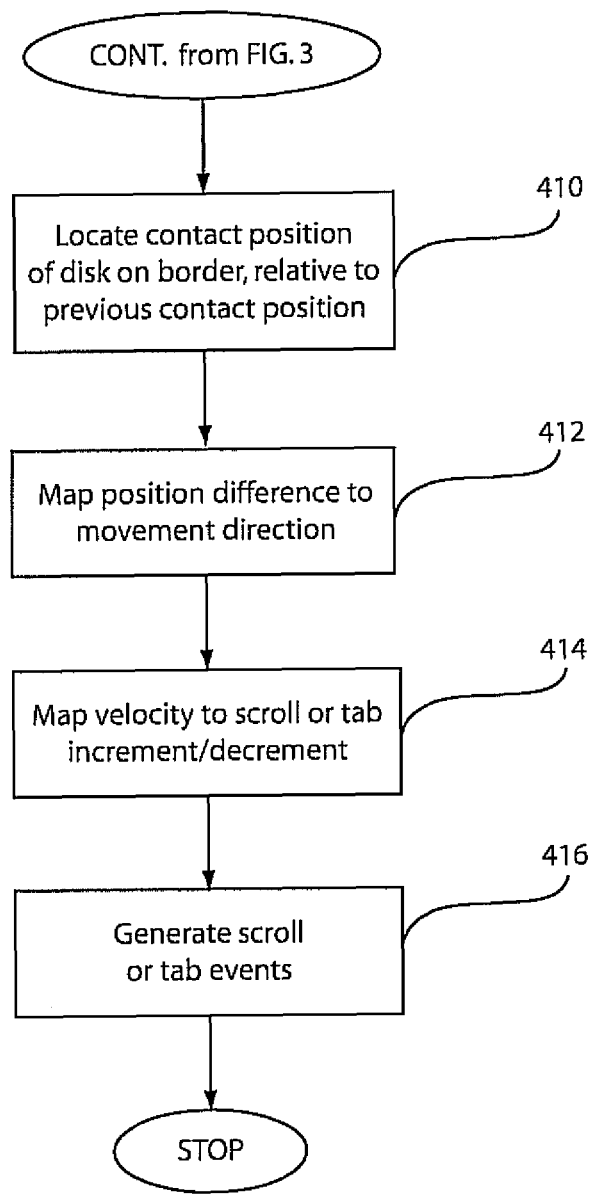
FIG. 4B is a block diagram showing how sustained scrolling movement is achieved in accordance with one illustrative embodiment.
Figure 5:
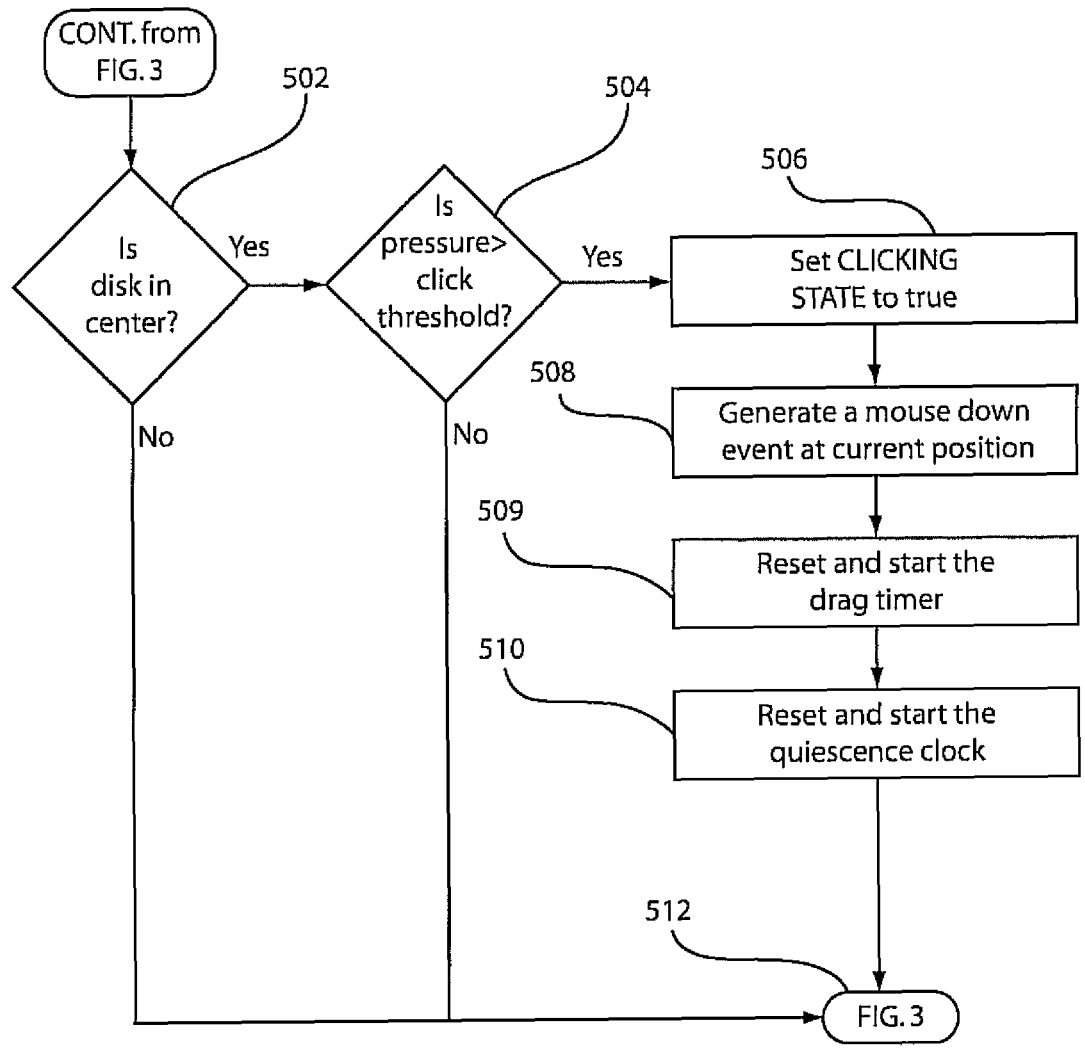
FIG. 5 is a block diagram showing how a mouse down event is achieved for locating a position and clicking on that position without requiring a user to simultaneously maintain a position and click at the same time.

In block 306, if the disk is not touching a border, then the program goes to FIG. 5 in block 336. If in block 306, it is determined that the disk is touching the border, then the "moving" state is set to true in block 320, and the program goes to FIG. 4A or 4B as per block 322.

FIGS. 4A and 4B provide alternative actions when the disk is determined to be in contact with a border. Referring to FIG. 4A, FIG. 4A is called from blocks 330 or 332 in FIG. 3. In block 402, a contact position of the disk on the border is located. This includes using position detection technology (sensors etc.) to determine where on the border contact has been made by the disk. In block 404, the contact position is mapped to a movement direction. This may include determining a direction by employing the border contact point and a reference point, e.g., a center position of the pad. In block 406, velocity and cursor displacement are computed. Other cursor actions or properties may also be determined. In block 408, a mouse movement event is generated. In other words, based on the interpretation of the user actions, the cursor is moved in accordance with a speed, direction, etc.

Referring to FIG. 4B, FIG. 4B is called from blocks 330 or 332 in FIG. 3. In block 410, a contact position on the border by the disk is located. This position is compared to a previous position to determine if scrolling is called for. Scrolling is interpreted here as a contact movement following the border (other actions are also contemplated for scrolling). In block 412, the position change is mapped to a movement direction to determine the scroll direction. In block 414, a velocity to scroll or tab increment or decrement (e.g., arrow keys) is mapped in accordance with the border contact information. In block 416, scroll or tab events are generated on screen in accordance with the user actions.

Referring to FIG. 5, FIG. 5 is called from blocks 334 or 336 in FIG. 3. In block 502, a determination of whether the disk is in the center of the pad (not touching a border) is made. If the disk is not in the center, the program goes to FIG. 3 in block 512. If the disk is in the center, in block 504, a click condition is checked by determination whether pressure exceeding a threshold has been applied. If not, then the program goes to FIG. 3 in block 512. If sufficient pressure is applied, then clicking is set to true in block 506, and a mouse down event is generated at a current position in block 508. The mouse down event means that the cursor is maintained at its current position during the clicking activity/event. This permits the user to not have to simultaneously maintain the position of the cursor while clicking.

Then, block 509 resets and starts the drag timer described above corresponding to block 339 in FIG. 3. Block 510 resets and starts the quiescence clock described above corresponding to block 338 in FIG. 3. Then, the program path goes to FIG. 3 in block 512.

Figure 6:
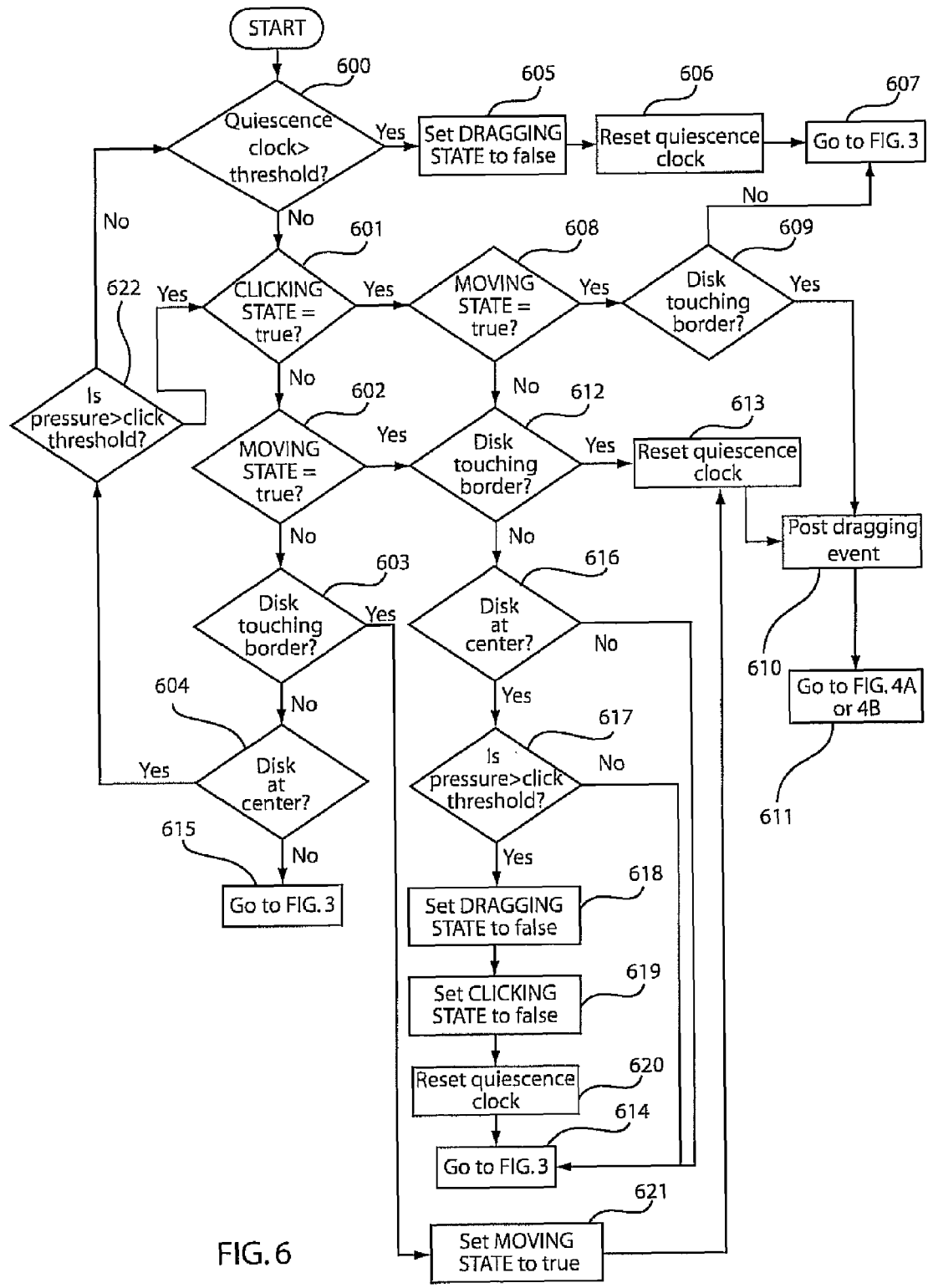
FIG. 6 is a block/flow diagram showing processes involved in the management of a "dragging" action performed by the user in accordance with one embodiment.

Referring to FIG. 6, block 600 makes a determination as to whether the quiescence clock, explained with reference to block 338 in FIG. 3, has exceeded its threshold value, signaling that no movement or changes in clicking state have occurred during the period measured by the clock. If it is determined that the current value of the quiescent clock in block 600 is not greater than a threshold, block 601 determines whether the "clicking state" is true. If clicking is not true, then block 602 determines whether the moving state is set to true. If moving in block 602 is not true, then block 603 determines whether the disk is touching the border. If it is not touching, then block 604 determines whether or not the disk is resting at the center 106 of the low friction surface or pad 104 in FIG. 1. If it is not resting at the center, the program goes to FIG. 3 in block 615. If it is in the center, then block 622 determines whether there is pressure exceeding the threshold for "clicking" on the disk. If the pressure does not, then return to block 600 to check the "quiescence clock" again.

If it is determined in block 600 that the quiescence clock has exceeded its threshold value or that the pressure tested in 622 exceeds the "clicking" threshold, then the dragging state is set to false in block 605. The quiescence clock is reset to zero in block 606, and the program goes to FIG. 3 in block 607.

If it is determined in block 601 that the clicking state is true, then block 608 determines if the moving state is true. If the moving state is true, then block 609 determines whether the disk is touching the raised border or lip 108 in FIG. 1. If block 609 determines that the disk is not touching the lip, the program goes to FIG. 3 in 607. If block 609 determines that the disk is touching the raised border or lip, a dragging event is posted in block 610. The program goes to FIG. 4A or 4B in block 611.

If in block 602, it is determined that the moving state is true, then block 612 determines whether the disk is touching the raised border or lip 108 in FIG. 1. If it is not touching, a determination of whether the disk is at the center of the pad is made in block 616, if the disk is not at the center, the program goes to FIG. 3. If the disk is touching the raised border in block 612, block 613 resets the quiescence clock. Then, block 610 posts a dragging event, and goes on to FIG. 4A or FIG. 4B in block 611. If in block 612 the disk is determined not to be touching the raised border, then go to block 616.

If in block 603, it is determined that the disk is touching the raised border 108 in FIG. 1, then the moving state is set to true in block 621, with the quiescence clock reset in block 613, a dragging event is posted in block 610. As before, block 611 goes to FIG. 4A or FIG. 4B.

If block 616 determines that the disk is not resting at the center of the pad, then in block 614, the program goes to FIG. 3. If block 616 determines that the disk is resting at the center of the pad, then block 617 determines whether the pressure on the disk exceeds the threshold value for "clicking". If block 617 determines that the pressure on the disk does not exceed the threshold value, then with block 614 the program goes to FIG. 3. if block 617 determines that the pressure on the disk exceeds the threshold value for "clicking", then block 618 sets the dragging state to false, block 619 sets the clicking state to false, block 620 resets the quiescence clock and block 614 goes to FIG. 3.

Figure 7:
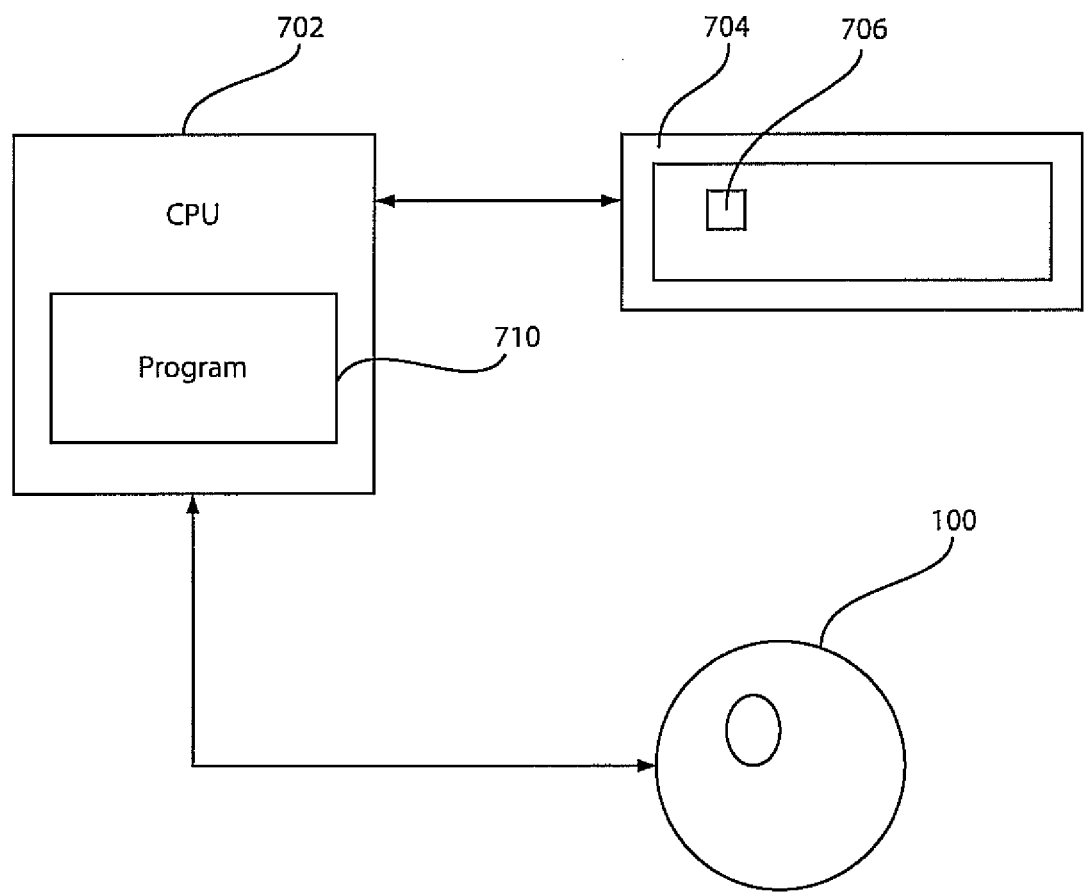
FIG. 7 is a block/flow diagram showing a system for employing a pointing device in accordance with an illustrative embodiment.

Referring to FIG. 7, the pointing device 100 is preferably an input device for a system 700 where positioning a cursor or other indicator is needed. System 700 may include a computer system, a computer device, such as a laptop, personal digital assistance or even a cellular telephone or the like. System 700 includes a computer processing unit (CPU) 702 or equivalent and a display device 704. The CPU 702 runs software, such as, e.g., a program 710 as described with respect to FIGS. 3, 4A, 4B, 5 and 6 for interfacing between the device 100 and the display 704 and interpreting actions of the pointing device 100. A cursor or other indicator 706 generated on the display 704. In one useful application, the cursor 706 is positioned or controlled (e.g., moving, clicking, dragging scrolling, tabbing, etc.) on the display 704 in accordance with the present principles.

Having described preferred embodiments of a device and method pointing device and method with error prevention features (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A pointing device, comprising:
   a pad occupying a region having a surface;
   a raised border at a perimeter of the region; and
   an object slidably movable on the pad for contacting the raised border,
   wherein the raised border includes a detecting device comprising at least one sensor configured to detect a physical contact by the object at any position on the raised border, wherein contact of the object with the raised border generates a signal for moving a generated pointer in a direction indicated by a position of the object on the raised border relative to a reference point.

2. The pointing device as recited in claim 1, wherein the pad includes a concave shape such that the object can slide to a neutral position on the pad when not in contact with the border and when released by a user.

3. The pointing device as recited in claim 1, wherein the pad includes a central position with an attractive force for attracting the object such that the object can slide to the central position on the pad when not in contact with the border and when released be a user.

4. The pointing device as recited in claim 1, wherein the border includes a mechanism to attract and maintain the object when in contact with the border.

5. The pointing device as recited in claim 4, wherein the mechanism includes magnets.

6. The pointing device as recited in claim 4, wherein the mechanism includes at least one of a deformable border material, a mechanical interlocking mechanism and an adhesive.

7. The pointing device as recited in claim 1, wherein the reference point comprises a center of the surface of the pad.

8. The pointing device as recited in claim 1, further comprising a sensor proximately located to the pad to sense a pressure applied by a user to the pad, wherein such pressure above a threshold is signaled for interpretation as a click.

9. The pointing device as recited in claim 1, further comprising a clock to measure time between pointing events such that a time less than a threshold and a moving event and a clicking event are contemporaneously determined and interpreted as a click.

10. The pointing device as recited in claim 1, further comprising at least one sensor in the border to sense a pressure applied by a user to the border, wherein such pressure is signaled for interpretation as a velocity.

11. The pointing device as recited in claim 1, further comprising at least one sensor in the border to sense a sliding pressure applied by a user to different positions on the border, wherein such pressure is translated to as one of a scrolling action and an action for moving a focus area for the generated pointer.

12. A pointing device, comprising:
   a pad occupying a region having a surface;
   a raised physical border at a perimeter of the region, wherein the raised border includes a detecting device including at least one sensor configured to detect a physical contact at any position on the raised physical border;
   a disk slidably movable on the pad for contacting the border; and
   a program configured to interpret contact of the disk with the raised physical border to move a generated pointer in a corresponding direction indicated by a contact position of the disk on the raised physical border relative to a center of the surface.

13. The pointing device as recited in claim 12, wherein the pad includes a concave shape such that the disk can slide to a neutral position on the pad when not in contact with the border and when released be a user.

14. The pointing device as recited in claim 12, wherein the pad includes a central position with an attractive force for attracting the disk such that the disk can slide to the central position on the pad when not in contact with the border and when released be a user.

15. The pointing device as recited in claim 12, wherein the border includes a mechanism to attract and maintain the disk when in contact with the border.

16. The pointing device as recited in claim 15, wherein the mechanism includes one or more of magnets, a deformable border material, a mechanical interlocking mechanism and an adhesive.

17. The pointing device as recited in claim 12, further comprising a sensor proximately located to the pad to sense a pressure applied by a user to the pad, wherein such pressure above a threshold is interpreted as a click.

18. The pointing device as recited in claim 12, further comprising a disk slidably movable on the pad for contacting the border and a sensor proximately located to the pad to sense a pressure applied by a user to the disk, wherein such pressure above a threshold is interpreted as a click.

19. The pointing device as recited in claim 12, further comprising at least one sensor in the border to sense a pressure applied by a user to the border, wherein such pressure is translated to a velocity of the generated pointer.

20. The pointing device as recited in claim 12, further comprising at least one sensor in the border to sense a sliding pressure applied by a user to different positions on the border, wherein such pressure is translated as one of a scrolling action and an action for moving a focus area for the generated pointer.

21. The pointing device as recited in claim 12, further comprising a clock to measure time between pointing events such that a time less than a threshold and a moving event and a clicking event are contemporaneously determined are interpreted as a click.

22. A method for controlling a generated pointer, comprising:
   providing a pad occupying a region having a surface and a raised physical border at a perimeter of the region, wherein the raised border includes a detecting device comprising at least one sensor configured to detect a physical contact at any position on the raised physical border by an object, wherein contact with the raised physical border generates a signal indicating a contact position on the raised physical border;
   interpreting contact at a location on a raised physical border as a command to move a generated pointer in a respective direction indicated by a position of the object on the raised border relative to a center of the surface; and
   moving the generated pointer in the respective direction while the contact persists.

23. The method as recited in claim 22, further comprising attracting the object to the border to maintain contact with the border.

24. The method as recited in claim 22, further comprising interpreting a pressure above a threshold applied by a user to the pad as a click, interpreting a pressure applied by a user to the border as a velocity for moving the generated pointer, interpreting a contemporaneous moving event and clicking event within a threshold time or quiescence as a drag, and interpreting a sliding pressure applied by a user to different positions on the border as one of a scrolling action and an action for moving a focus area for the generated pointer.

25. A computer readable medium for controlling a generated pointer comprising a computer readable program, wherein the computer readable program when executed on a computer causes the computer to perform the steps of:

in a pointer device having a pad occupying a region having a surface, providing a raised physical border at a perimeter of the region, wherein the raised border includes a detecting device comprising at least one sensor configured to detect a physical contact at any position on the raised physical border by an object, wherein contact with the raised physical border generates a signal indicating a contact position on the raised physical border, interpreting contact at a location on a raised physical border as a command to move a generated pointer in a respective direction indicated by a position of the object on the raised border relative to a center of the surface; and moving the generated pointer in the respective direction while the contact persists.

* * * * *